(12) United States Patent
Sun et al.

(10) Patent No.: US 8,140,473 B2
(45) Date of Patent: Mar. 20, 2012

(54) REAL-TIME FILE SYNCHRONIZATION

(75) Inventors: Jingdong Sun, Rochester, MN (US); Qian Sun, Rochester, MN (US); Jian Tang, Rochester, MN (US); Xiaoming Yu, Rochester, MN (US); Jingli Zhang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/266,582

(22) Filed: Nov. 7, 2008

(65) Prior Publication Data

US 2010/0121818 A1   May 13, 2010

(51) Int. Cl.
*G06F 17/30* (2006.01)
(52) U.S. Cl. ........................................ 707/609; 707/610
(58) Field of Classification Search .......................... None
See application file for complete search history.

(56) References Cited

U.S. PATENT DOCUMENTS

| 6,816,872 B1 * | 11/2004 | Squibb ................................. 1/1 |
| 2003/0137528 A1 | 7/2003 | Wasserman et al. |
| 2006/0256821 A1 | 11/2006 | Richards |

\* cited by examiner

*Primary Examiner* — Hung Q Pham
(74) *Attorney, Agent, or Firm* — Cantor Colburn LLP

(57) ABSTRACT

A method of real-time file synchronization includes segmenting a file to be synchronized into a plurality of segments, each segment of the plurality of segments representing a portion of the file to be displayed on slave systems. The method further includes indexing the plurality of segments into a file index, the file index organized based on the format of the file to be synchronized. The method further includes generating a synchronization key, the synchronization key being included within the file to be synchronized. The method further includes transmitting a synchronization signal if a segment change is detected, the synchronization signal including a file index value, the file index value representing the segment change. The method further includes receiving the synchronization signal.

8 Claims, 3 Drawing Sheets

REAL-TIME FILE SYNCHRONIZATION

BACKGROUND

Embodiments of the present invention are generally directed to file synchronization, and more particularly, to real-time synchronization of multiple files.

Generally, as more and more people work remotely, multiple parties need to refer to a common document for visual reference, for example, during a remote meeting or teleconference. Synchronizing the shared information between a presenter and participants becomes a common issue due to frequent updates to the contents of shared material or presentation materials (e.g., changing slides based on the presenter's view). For example, as a presenter progresses through slides or photos from a master terminal, each remote user must update their display accordingly and without direct visual reference to the master terminal.

In some cases, the participants of a remote meeting have their own copies of documents and the presenter has its own copy. It follows that with multiple copies of a single file, there may be discrepancies and/or it may become difficult to synchronize displayed information for each file copy. In other cases, the files used by participants are in different formats, but the display of the files needs to be synchronized. For example, syncing the display of a slide and associated audio content.

BRIEF SUMMARY

An embodiment of the invention includes a method of real-time file synchronization. The method includes segmenting a file to be synchronized into a plurality of segments, each segment of the plurality of segments representing a portion of the file to be displayed on slave systems. The method further includes indexing the plurality of segments into a file index, the file index organized based on the formats of the files to be synchronized. The method further includes generating a synchronization key and the synchronization key being included within the file to be synchronized. The method further includes transmitting a synchronization signal if a segment change is detected, the synchronization signal including a file index value, the file index value representing the segment change. The method further includes receiving the synchronization signal.

BRIEF DESCRIPTION OF THE SEVERAL VIEWS OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION

Figure 1:
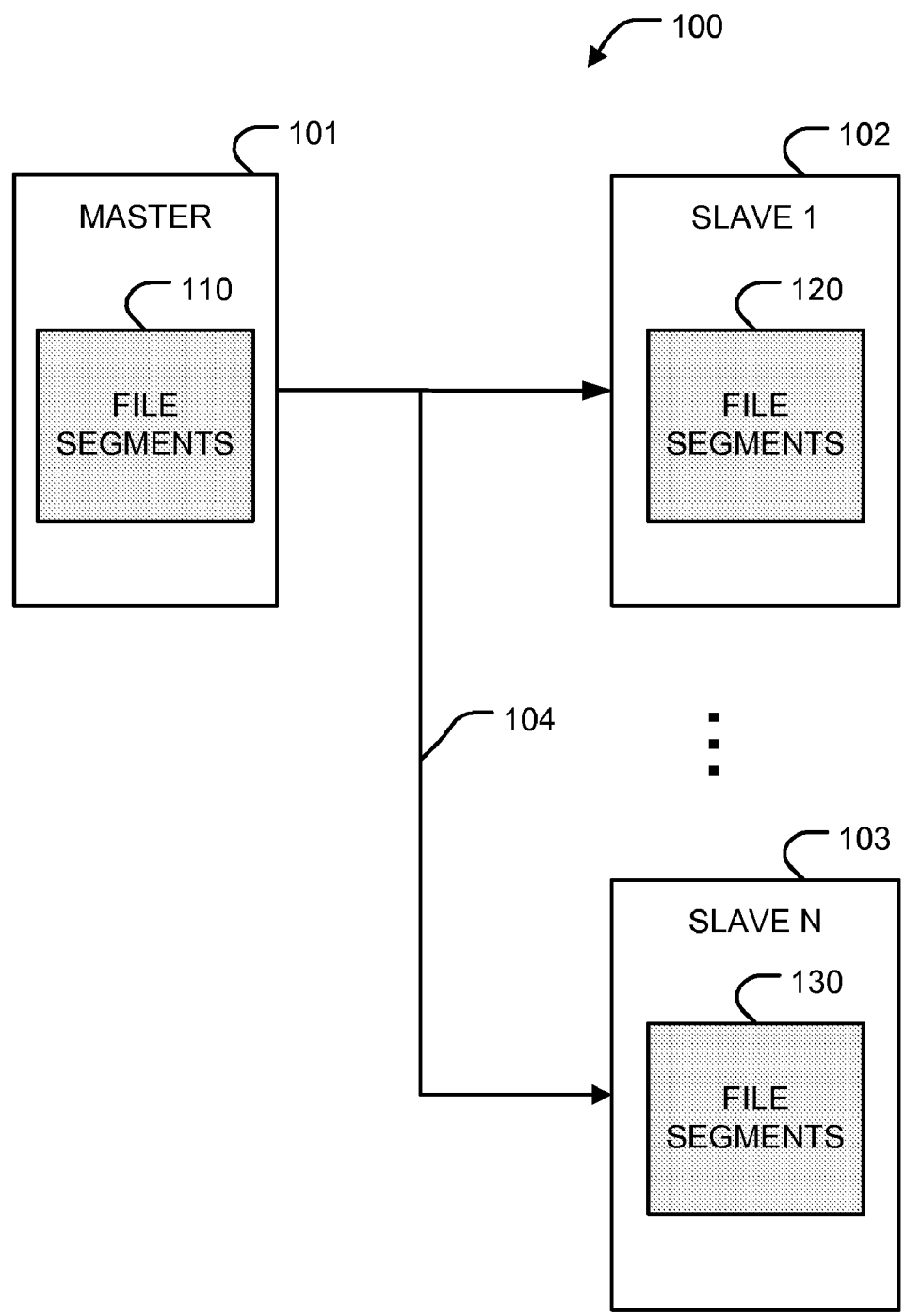
FIG. 1 illustrates a file synchronization system, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

According to example embodiments, a solution is provided which significantly decreases the complexity of file synchronization across multiple platforms and multiple file types, versions, etc. The technical effect of the decrease in complexity is providing less computation and smoother synchronization across multiple files in a real-time scenario ultimately resulting in less bandwidth usage.

Example embodiments provide a method allowing synchronization among documents of any format with the aid of a lightweight application running on all participating systems. This lightweight application is responsible for sending and receiving synchronization signals, and takes appropriate synchronization actions based on its predefined roles. This method greatly enhances the effectiveness and efficiencies of teleconferences, remote meetings, and other general usage. For example, according to example embodiments, low demand for network bandwidth may be achieved through lightweight file synchronization. Because only a limited number of small signals will be transmitted on the wire or wirelessly for synchronization, there is no requirement for high-speed communications as required in screen sharing programs. Typically, screen-sharing programs consume relatively large quantities of bandwidth, especially if the content includes a complicated image, or contains many lines of code.

Furthermore, according to example embodiments, the capability of real time synchronization may be achieved through lightweight file synchronization. For example, lightweight file synchronization applications may be executed on all participating systems, such that these systems transmit and receive synchronizing signals to keep accurate and real time synchronization between the remote applications.

Furthermore, according to example embodiments, document-sharing flexibility may be achieved through lightweight file synchronization. For example, a shared document on a master system does not have to be the same document on all other systems. Because only synchronization signals are sent through network, there is no requirement that the same document has to be used. A file may be segmented and each segment indexed before a remote meeting, presentation, or any other file synchronization event. The indexed segments may be identified across all participating systems, and therefore, index information may be used to synchronize, or progress, through a visual display of information during the event (e.g., progressing through slides or other information). This feature is useful if a master user uses a document copy in an editable format, but remote viewers access the file information as a presentation or un-editable format. This feature may also be used to synchronize among a plurality of applications and documents, such as audio recording files and corresponding presentation files based on the segmentation indexes.

According to example embodiments, multiple documents are used on multiple systems. These multiple documents may be document copies sent to multiple users prior to remote access (e.g., remote conferencing or meetings). For example, a master user (e.g., remote meeting speaker) might read presentation slides with embedded comments/notes, while the listeners read a slide-show format of the information, each of which are different documents as the documents are indexed before the file synchronization event/remote meeting/etc.

As set forth in the following discussion of example embodiments, a lightweight file synchronization application will be executed on all participating systems. The application on a master system will send signals with page/index synchronizing information. The applications on participating systems will be configured to receive synchronization/index signals from the master system and synchronize the contents accordingly. In addition, participating systems may become master systems, thereby enabling synchronization of their contents.

As illustrated in FIG. 1, a file synchronization system may include master and slave systems as described above (see 101-103). The system 100 may include a master system 101, a first slave system 102, and any other number of slave systems 103. The systems included in system 100 may be computer apparatuses, user terminals, personal digital assistants (PDA), cellular telephones, or any other devices/systems suited for receipt of light-weight synchronization signals and for display or editing of contents of a synchronized file's information. Communications between systems 101-103 may be established using communications channel 104. The communications channel 104 may be any communications channel suited for transmission of lightweight synchronization signals as set forth herein.

The master system 101 is configured to transmit/send a synchronization signal (described in more detail with reference to FIG. 2) if file segments/information (e.g., 110, 120, 130) are changed. For example, a lightweight synchronization application applying the methodologies described herein may be executed on the master system 101. The lightweight application listens for a file segment change event, creates a synchronization signal, and subsequently transmits/sends the synchronization signal to slave systems/applications (e.g., 102-103). There may be a plurality of different synchronization signals created within any one implementation. The synchronization signals may include file/segment index information such that a slave system may move to the signaled index upon signal receipt.

The slave systems (e.g., 102-103) are configured to receive the synchronization signals and adjust file segments/information (e.g., 120, 130) accordingly. The slave lightweight applications on slave systems listen to the master system, receive synchronization signal(s), and subsequently synchronize the display of local file segments/information (e.g., 120, 130) based on the received synchronization signals. For example, as a presenter (e.g., user of master system 101) progresses through a slide presentation, synchronization signals are transmitted to synchronize the display of slides on slave systems according to the segment/slide being displayed on the master system. In this manner, real-time file synchronization may be established.

According to at least one example embodiment, the synchronization key does not include the segments and the index. Furthermore, the synchronization key should be specific to the files used for presenting or remote access, such that these files may be located at run-time. The key, index, and IP address are distributed with the file and/or are included in the file. The synchronization signal is transmitted at run time and should include the current (i.e., changed) index. These aspects are described more fully with reference to the file synchronization method below.

Figure 2:
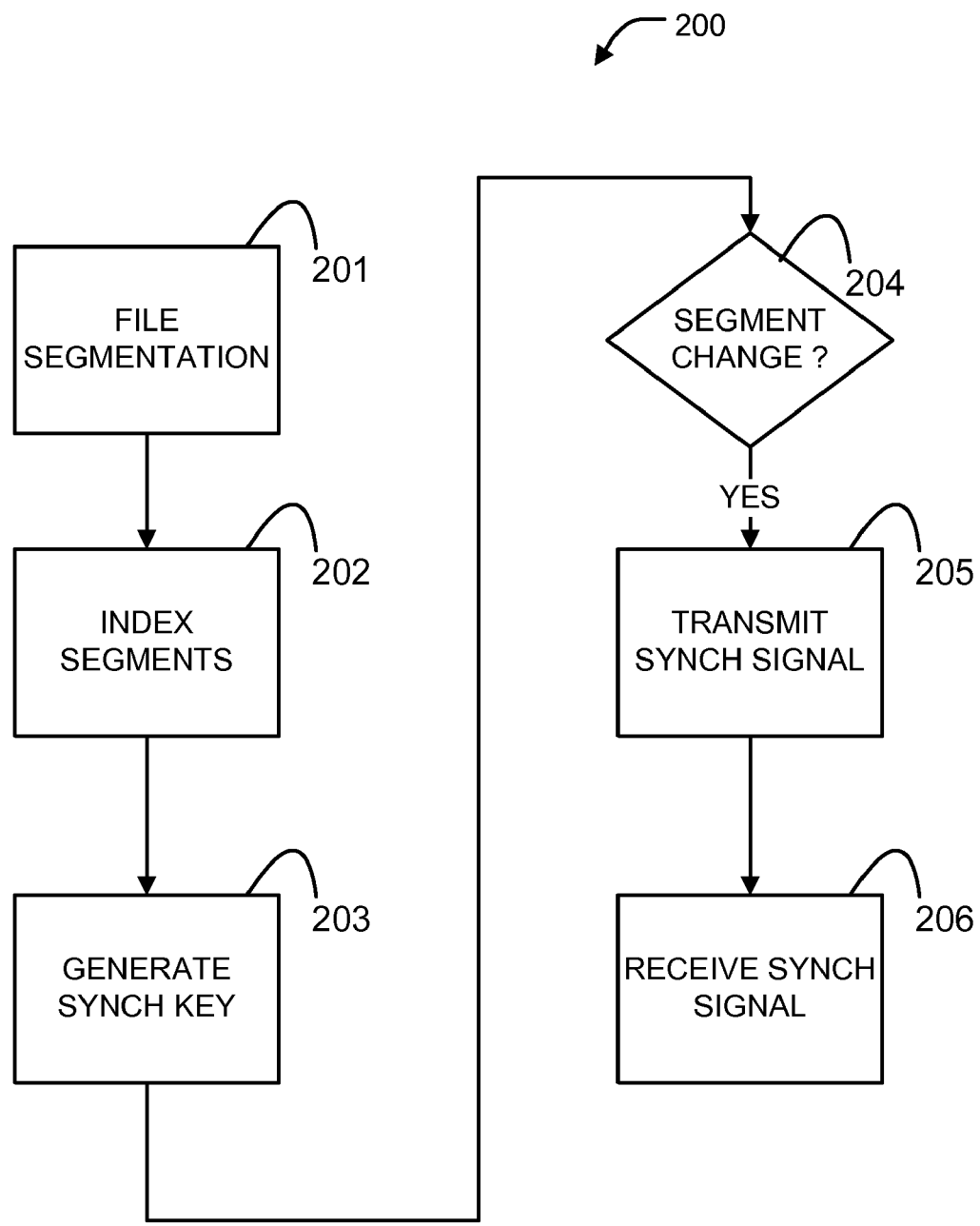
FIG. 2 illustrates a method, according to an example embodiment.

Hereinafter, example embodiments including a file synchronization method are described more fully with reference to FIG. 2. FIG. 2 illustrates a file synchronization method, according to an example embodiment. The method 200 includes segmenting a file to be synchronized at block 201. For example, a file is manually or automatically divided into segments. A segment may be pre-defined by users or based on fixed-size, dynamic index, or any other suitable means. Segments may also be defined based on different forms of measurement, such as pages, lines and/or pixels. For example, in a slide presentation, a page may be a segment, or in an audio file associated with a presentation file, the segment may be the audio duration in which one page is presented.

The method 200 further includes indexing segments at block 202. Each segment may be assigned an index which acts as a synchronization point. For example, in a slide presentation file, each page is indexed with its page number, and in an audio presentation, each segment referencing a particular slide is assigned an index the same as the particular slide number.

The method 200 further includes generating a synchronization key at block 203. For example, before a presentation or file synchronization event, a key is generated by the master/controller and broadcasted/transmitted to all participants/slaves. The master system configures the application with the desired synchronizing information (key, index, IP address for remote communication, etc). The synchronization information should be part of the document as it is distributed prior to the meeting/file synchronization event. The receiving end/slave system does not need to configure the document, unless any configuration changes during synchronization, such as an IP address change or other configuration change.

During the presentation/file synchronization event, every time a segment in the master copy is changed (e.g., progressing through slides), the application on the master system will transmit a synchronization signal (see blocks 204, 205, 206). All slave applications should receive the signal. The synchronization signal may be in a tuple format (e.g., key, index). If the synchronization software receives the signal, it finds all documents associated with this key and advances to the page or segment associated with that index. Furthermore, the synchronization software may provide automatic updates to the IP addresses of participating systems to enable more fluid synchronization during configuration changes. As such, example embodiments of the present invention provide real-time file synchronization.

Figure 3:
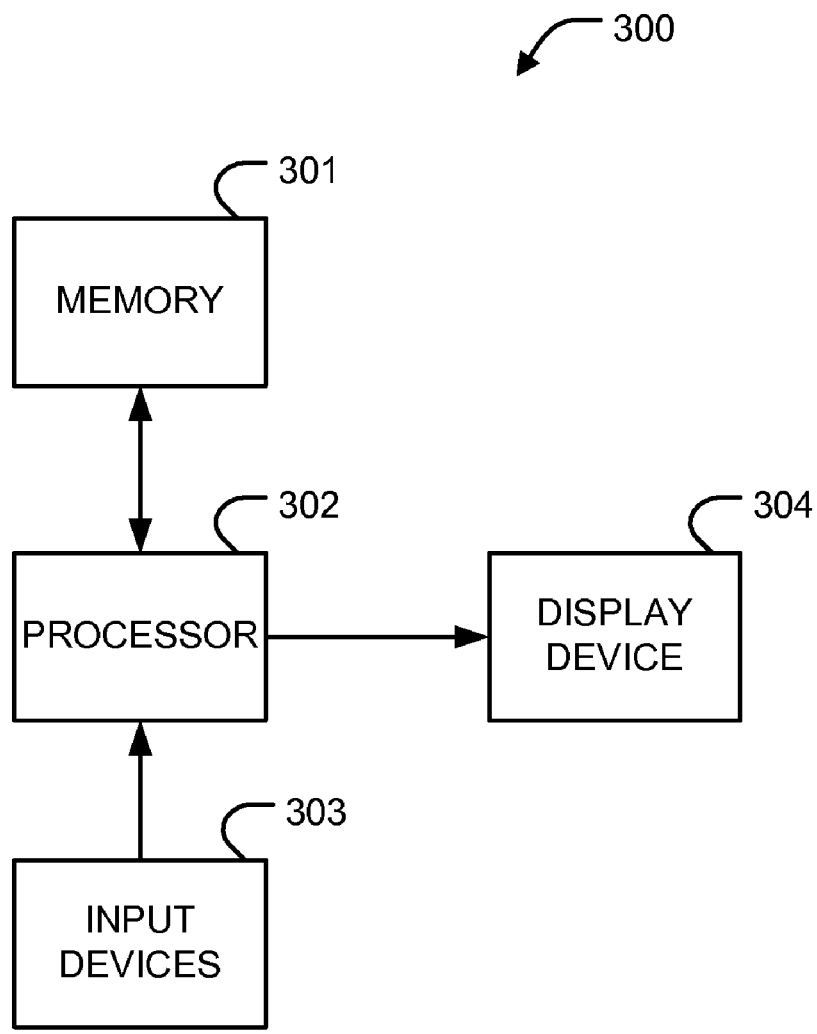
FIG. 3 illustrates a computer apparatus, according to an example embodiment.

Furthermore, according to an example embodiment, the methodologies described hereinbefore may be implemented by a computer system or apparatus. For example, FIG. 3 illustrates a computer apparatus (e.g., computer apparatuses/systems 101-103 of FIG. 1), according to an example embodiment. Therefore, portions or the entirety of the methodologies described herein may be executed/created as instructions in a processor 302 of the computer system 300. The computer system 300 includes memory 301 for storage of instructions and information, input device(s) 303 for computer communication, and display device 304. Thus, the present invention may be implemented, in software, for example, as any suitable computer program on a computer system somewhat similar to computer system 300. For example, a program in accordance with the present invention may be a computer program product causing a computer to execute the example methods described herein.

The computer program product may include a computer-readable medium having computer program logic or code portions embodied thereon for enabling a processor (e.g., 302) of a computer apparatus (e.g., 300) to perform one or more functions in accordance with one or more of the example methodologies described above. The computer program logic may thus cause the processor to perform one or more of the example methodologies, or one or more functions/features of a given embodiment described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks.

Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of real-time file synchronization, comprising:
   segmenting a file to be synchronized into a plurality of segments, each segment of the plurality of segments representing a portion of the file to be displayed on at least two systems;
   indexing the plurality of segments into a file index, the file index is organized based on the formats of the files to be synchronized;
   generating a synchronization key, the synchronization key being included within the file to be synchronized;
   transmitting a synchronization signal if a segment change is detected, the synchronization signal including a file index value, the file index value representing the segment change;
   receiving the synchronization signal;
   transmitting the file to be synchronized to a plurality of slave systems;
   broadcasting the synchronization key to the plurality of slave systems; and
   synchronizing the file to be synchronized on each system of the plurality of slave systems, the file being synchronized upon receipt of the synchronization signal and being synchronized to the file index value.

2. The method of claim 1, wherein segmenting the file includes dividing the file to be synchronized into the plurality of segments based on a pre-defined segment format.

3. The method of claim 2, wherein the pre-defined segment format is one of pages, lines, slides, pixels, video duration, and audio duration of the file to be synchronized.

4. The method of claim 1, wherein the file index corresponds to page numbers, slide numbers, line numbers, or audio/video portions of the file to be synchronized.

5. The method of claim 1, wherein a master system performs the segmenting, indexing, generating, and transmitting, and a slave system receives the synchronization signal.

6. The method of claim 1, wherein the file to be synchronized is copied into a plurality of formats including an editable format and an un-editable format, and the un-editable format is synchronized to the editable format.

7. The method of claim 6, further comprising:
   transmitting the un-editable format to the plurality of slave systems;
   broadcasting the synchronization key to the plurality of slave systems; and
   synchronizing the un-editable format on each system of the plurality of slave systems to the editable format, the un-editable format being synchronized upon receipt of the synchronization signal and being synchronized to the file index value.

8. A method of real-time file synchronization, comprising:
   segmenting a file to be synchronized into a plurality of segments, each segment of the plurality of segments representing a portion of the file to be displayed on at least two systems;
   indexing the plurality of segments into a file index, the file index is organized based on the formats of the files to be synchronized;
   generating a synchronization key, the synchronization key being included within the file to be synchronized;
   transmitting a synchronization signal if a segment change is detected, the synchronization signal including a file index value, the file index value representing the segment change;
   receiving the synchronization signal;
   transmitting the file to be synchronized from a slave system to a plurality of participating systems;
   broadcasting the synchronization key to the plurality of participating systems; and
   synchronizing the file to be synchronized on each system of the plurality of participating systems, the file being synchronized upon receipt of the synchronization signal and being synchronized to the file index value.

* * * * *